United States Patent
Fuh et al.

(10) Patent No.: US 6,278,994 B1
(45) Date of Patent: *Aug. 21, 2001

(54) FULLY INTEGRATED ARCHITECTURE FOR USER-DEFINED SEARCH

(75) Inventors: Gene Y. C. Fuh; Nelson Mendonca Mattos; Brian Thinh-Vinh Tran, all of San Jose; Yun Wang, Saratoga, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,302

(22) Filed: Jul. 9, 1998

Related U.S. Application Data

(60) Provisional application No. 60/052,180, filed on Jul. 10, 1997.

(51) Int. Cl.[7] ................................................. G06F 17/30
(52) U.S. Cl. ................................. 707/4; 707/104; 707/102
(58) Field of Search .................................. 707/104, 4, 3, 707/5, 103, 2, 102; 717/1; 713/201

(56) References Cited

U.S. PATENT DOCUMENTS

| | | | |
|---|---|---|---|
| 4,531,186 | 7/1985 | Knapman | 364/300 |
| 4,841,433 | 6/1989 | Hakim et al. | 364/200 |
| 4,961,139 | * 10/1990 | Hong et al. | 364/200 |
| 5,043,872 | 8/1991 | Cheng et al. | 364/200 |
| 5,299,123 | 3/1994 | Wang et al. | 364/419 |
| 5,327,543 | 7/1994 | Miura et al. | 395/375 |
| 5,404,510 | 4/1995 | Smith et al. | 395/600 |
| 5,423,035 | * 6/1995 | DePrez | 395/600 |
| 5,454,039 | 9/1995 | Coppersmith et al. | 380/28 |
| 5,495,609 | * 2/1996 | Scott | 707/8 |
| 5,544,357 | 8/1996 | Huei | 395/600 |
| 5,546,576 | 8/1996 | Cochrane et al. | 395/600 |
| 5,553,281 | 9/1996 | Brown et al. | 395/600 |
| 5,590,325 | 12/1996 | Kolton et al. | 395/615 |

(List continued on next page.)

FOREIGN PATENT DOCUMENTS 0 650 131 A1   4/1995 (EP) .

OTHER PUBLICATIONS

"Heirarchical Data Model for a Relational Database based Geographic Information System", *IBM® Technical Disclosure Bulletin,* 40(03):107–116 (Mar. 1997).

Lynch, C. et al., "Extended User—Defined indexing with Application to Textual Databases", Proceedings of the 14th VLDB Conference, pp. 306–317 (1988).

Rudolf Bayer, "The Universal B—Tree for Multidimensional Indexing: General Concepts", Worldwide Computing and Its Applications, International Conference, WWCA '97, Tsukuba, Japan, (Mar. 1997).

(List continued on next page.)

*Primary Examiner*—Hosain T. Alam
*Assistant Examiner*—Anh Ly
(74) *Attorney, Agent, or Firm*—Sughrue, Mion, Zinn, Macpeak & Seas, PLLC

(57) ABSTRACT

A method, apparatus, and article of manufacture for a computer-implemented integrated architecture for user-defined search. A statement is executed in a database stored on a data storage device connected to a computer, and the database contains data. Under control of the database, a statement is received that requests manipulation of the data. The statement includes a user-defined function. An index of a user-defined index type is used to access the data. The user-defined function is processed with the accessed data.

22 Claims, 8 Drawing Sheets

U.S. PATENT DOCUMENTS

| | | | | |
|---|---|---|---|---|
| 5,604,892 | | 2/1997 | Nuttall et al. .......................... | 395/500 |
| 5,608,904 | | 3/1997 | Chaudhuri et al. ................... | 395/602 |
| 5,619,692 | | 4/1997 | Malkemus et al. ................... | 395/600 |
| 5,630,120 | * | 5/1997 | Vachey . | |
| 5,630,125 | | 5/1997 | Zellweger ............................. | 395/614 |
| 5,630,127 | | 5/1997 | Moore et al. .......................... | 395/615 |
| 5,765,147 | * | 6/1998 | Mattos et al. ............................. | 707/4 |
| 5,799,310 | * | 8/1998 | Anderson et al. .................... | 707/102 |
| 5,806,061 | * | 9/1998 | Chaudhuri et al. ....................... | 707/3 |
| 5,864,843 | * | 1/1999 | Carino, Jr. et al. ....................... | 707/4 |
| 6,065,013 | * | 8/1997 | Fuh et al. ............................... | 707/103 |
| 6,067,542 | * | 9/1998 | Carino, Jr. ............................... | 707/4 |
| 6,175,835 | * | 1/1999 | Shadmon ............................. | 707/102 |
| 6,192,358 | * | 7/1998 | Fuh et al. ................................. | 707/4 |
| 6,208,993 | * | 7/1999 | Shadmon ............................. | 707/102 |

OTHER PUBLICATIONS

Faloutsos, C. et al., "Fast Map: A Fast Algorithm for Indexing, Data—Mining and Visualization of Traditional and Multimedia Datasets", Proc. of ACM SIGMOD, pp. 163–174 (May 1995).

Ouksel, M. et al.., "Multidimensional B—trees: Analysis of Dynamic Behavior", Dept. of Elec. Eng. and Computer Science, Northwestern Univ., Evanston, Ill., BIT 21, pp. 401–418 (1981).

Klaus, F. et al., "Flexible, Runtime Efficient Fector—Radix Algorithms For Multidimensional Fast Fourier Transform", SPIE, voll 2247, Sensors and Control for Automation, pp. 216–226 (1994).

Silberschatz, A. et al., "Managing Class Types", SPI Database of Software Technologies, 6 pages,(May 1977).

Scheuermann, P. et al., "Multidimensional B—Trees For Associative Searching In Database Systems", Inform. Systems, vol. 7, No. 2, pp. 123–137 (1982).

* cited by examiner

FULLY INTEGRATED ARCHITECTURE FOR USER-DEFINED SEARCH

PROVISIONAL APPLICATION

This application claims the benefit of U.S. Provisional Application No. 60/052,180, entitled "User Defined Search in Relational Database Management Systems," filed on Jul. 10, 1997 pending, by Gene Y. C. Fuh et al., which is incorporated by reference herein.

CROSS-REFERENCE TO RELATED APPLICATIONS

This application is related to the following copending and commonly-assigned patent applications.

Application Ser. No. 08/914,394, entitled "User-Defined Search in Relational Database Management Systems," filed on same date herewith, by Gene Y. C. Fuh, et al., now U.S. Pat. No. 6,065,013.

Application Ser. No. 09/112,723, entitled "Supporting Database Indexes Based on a Generalized B-Tree Index," filed on same date herewith, by Stefan Dessloch, et al., now U.S. Pat. No. 6,219,662.

Application Serial No. 09/112,301, entitled "Multiple-Stage Evaluation of User-Defined Predicates," filed on same date herewith, by Gene Y. C. Fuh, et al., now U.S. Pat. No. 6,192,358.

Application Ser. No. 09/112,307, entitled "A Generalized Model for the Exploitation of Database Indexes," filed on same date herewith, by Gene Y. C. Fuh, et al.

Application Ser. No. 09/113,802, entitled "Run-time Support for User-Defined Index Ranges and Index Filters," filed on same date herewith, by Michelle Jou, et al.

Application Ser. No. 08/786,605, entitled "A Database Management System, Method and Program for Supporting the Mutation of a Composite Object Without Read/Write and Write/Write Conflicts," filed on Jan. 21, 1997, by Linda G. DeMichiel, et al.; and Application Ser. No. 08/914,394, entitled "An Optimal Storage Mechanism for Persistent Objects in DBMS," filed on Aug. 19, 1997, by Gene Y. C. Fuh, et al.

all of which are incorporated by reference herein.

BACKGROUND OF THE INVENTION

1. Field of the Invention

This invention relates in general to computer-implemented database systems, and, in particular, to a fully integrated architecture for user-defined search.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

In some conventional systems, such as a geographical information system, a database may contain user-defined data, such as audio, video, image, text, spatial data (e.g., shape, point, line, polygon, etc.), time series data, OLE documents, Java objects, C++objects, etc. In some conventional geographical information systems, when a database includes user-defined data, the RDBMS is unable to understand the user-defined data. Therefore, in these conventional geographical information systems, an interface is provided between the geographical information system and a RDBMS that enables manipulation of user-defined data. In particular, the interface receives a query containing user-defined data constraints. The interface transforms the query into one that can be understood by the RDBMS. When the RDBMS returns data, the interface transforms the data into data that can be understood by the geographic information system.

Therefore, there is a need in the art for an improved architecture for database systems that enables a data base system to understand and manipulate user-defined data.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented integrated architecture for user-defined search.

In accordance with the present invention, a statement is executed in a database stored on a data storage device connected to a computer, and the database contains data. Under control of the database, a statement is received that requests manipulation of the data. The statement includes a user-defined function. An index of a user-defined index type is used to access the data. The user-defined function is processed with the accessed data.

An object of the invention is to push maintenance of user-defined data types into the database. Another object of the invention is to push user-defined functions and predicates into the database. Yet another object of the invention is to push index maintenance and index exploitation into the database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
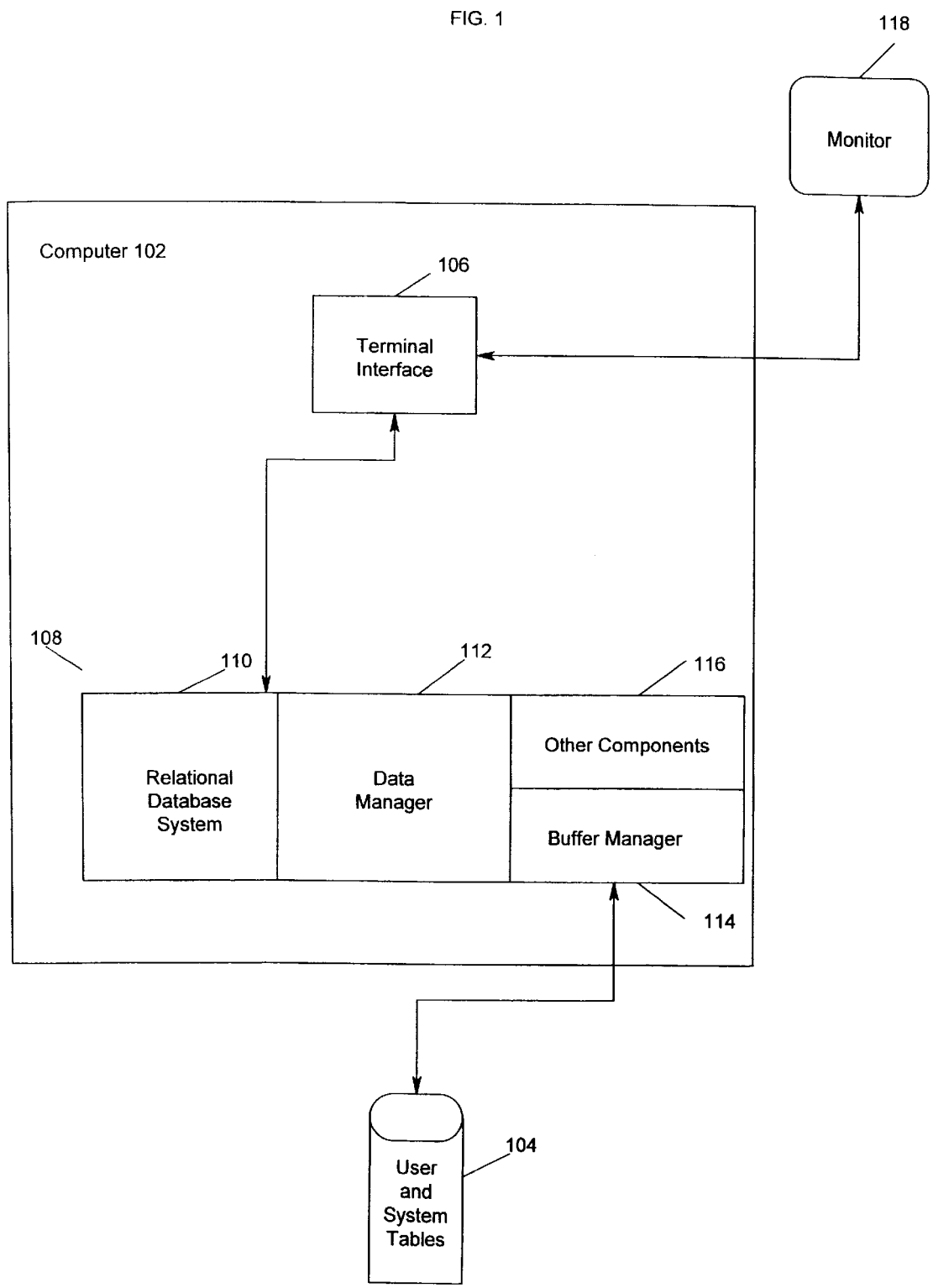
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
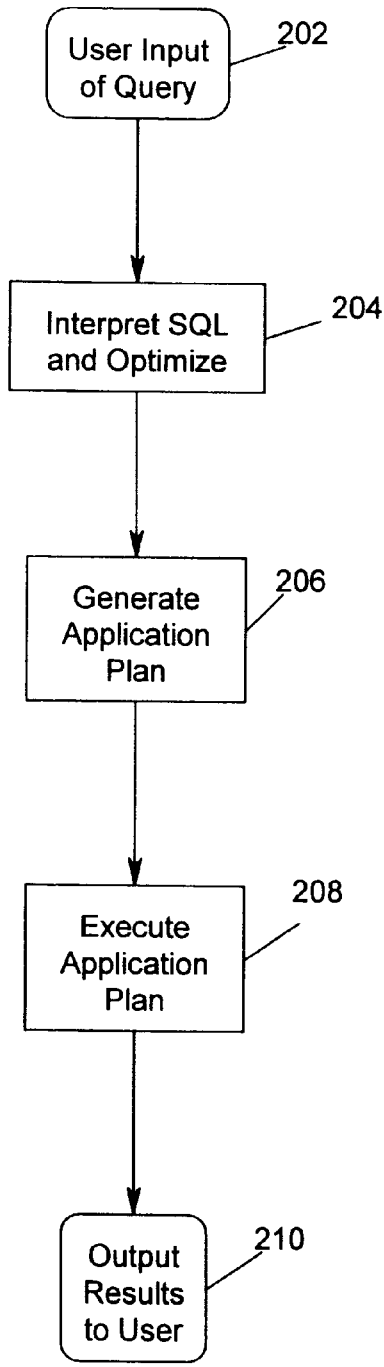
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
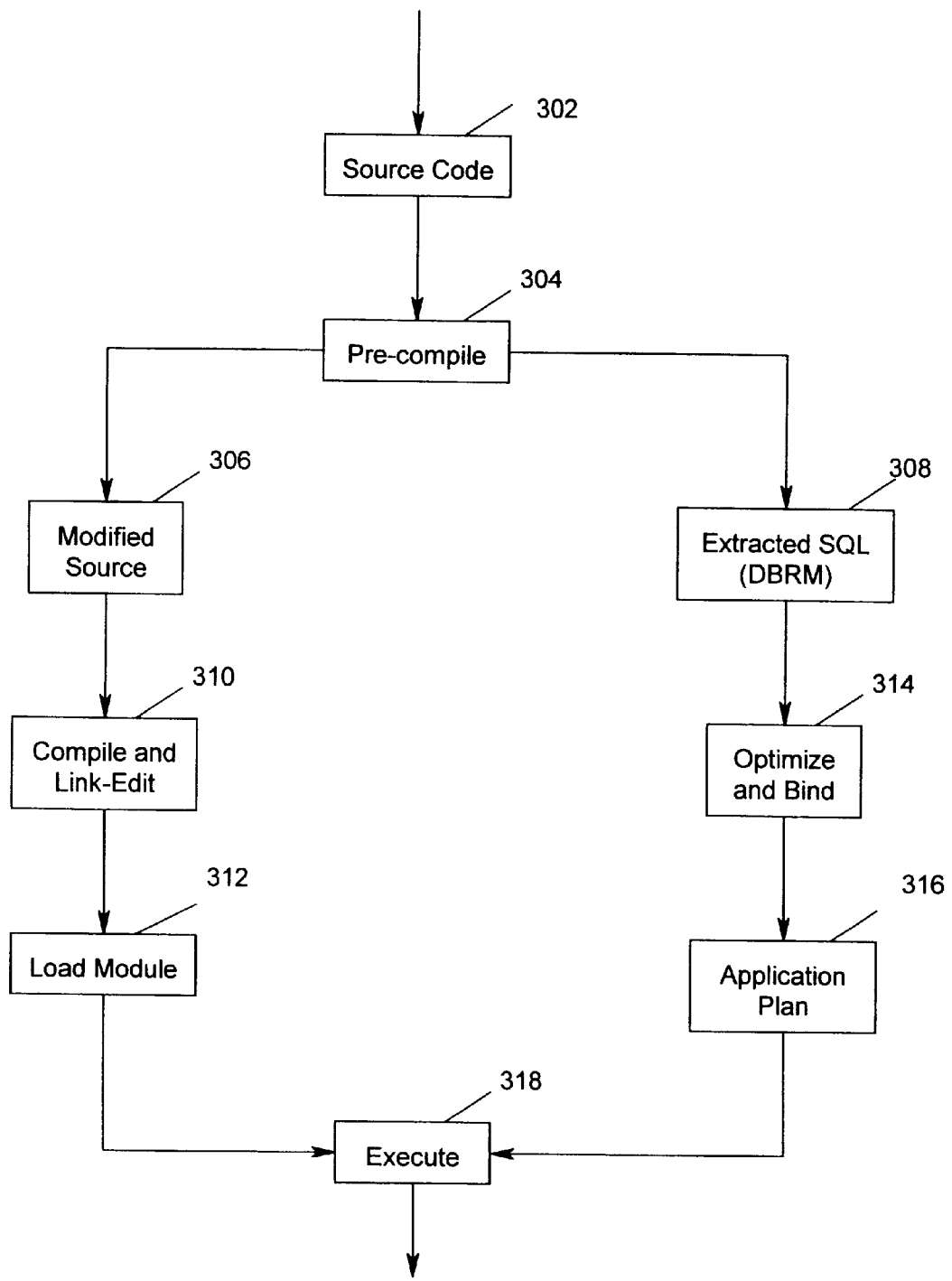
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

A Fully Integrated Architecture for User-Defined Search

The present invention provides a fully integrated architecture for user-defined search. The fully integrated architecture provides "extended" modules that provide the capability for pushing user-defined data types, indexes for the user-defined data types, and user-defined functions and predicates inside the RDBMS. User-defined data types include structured data types, such as abstract data types (ADTs). The fully integrated architecture enables a user to define data types using constructs understood by the RDBMS. For user-defined indexes, the fully integrated architecture pushes index maintenance and index exploitation into the RDBMS. Moreover, the fully integrated architecture enables a user to define functions and predicates that can be processed by the RDBMS. By pushing user-defined data types, indexes, and user-defined functions and predicates into the RDBMS, the fully integrated architecture allows the RDBMS to manipulate structured data, such as media, audio, or spatial data.

In one embodiment of the invention, the present invention provides a fully integrated architecture for user-defined search of user-defined data. User-defined data includes, for example, spatial data, which is data indicating the shape or location of an object. For example, spatial data for a circle object may be a radius and X,Y coordinates for a center point in a plane. Additionally, spatial data for a location of an object, such as a street, may include X,Y coordinates that identify the path of the street on a map. In the following discussion, for illustration purposes only, spatial data will be used in examples. The present invention would handle other types of user-defined data, such as audio, in a similar manner.

Figure 4:
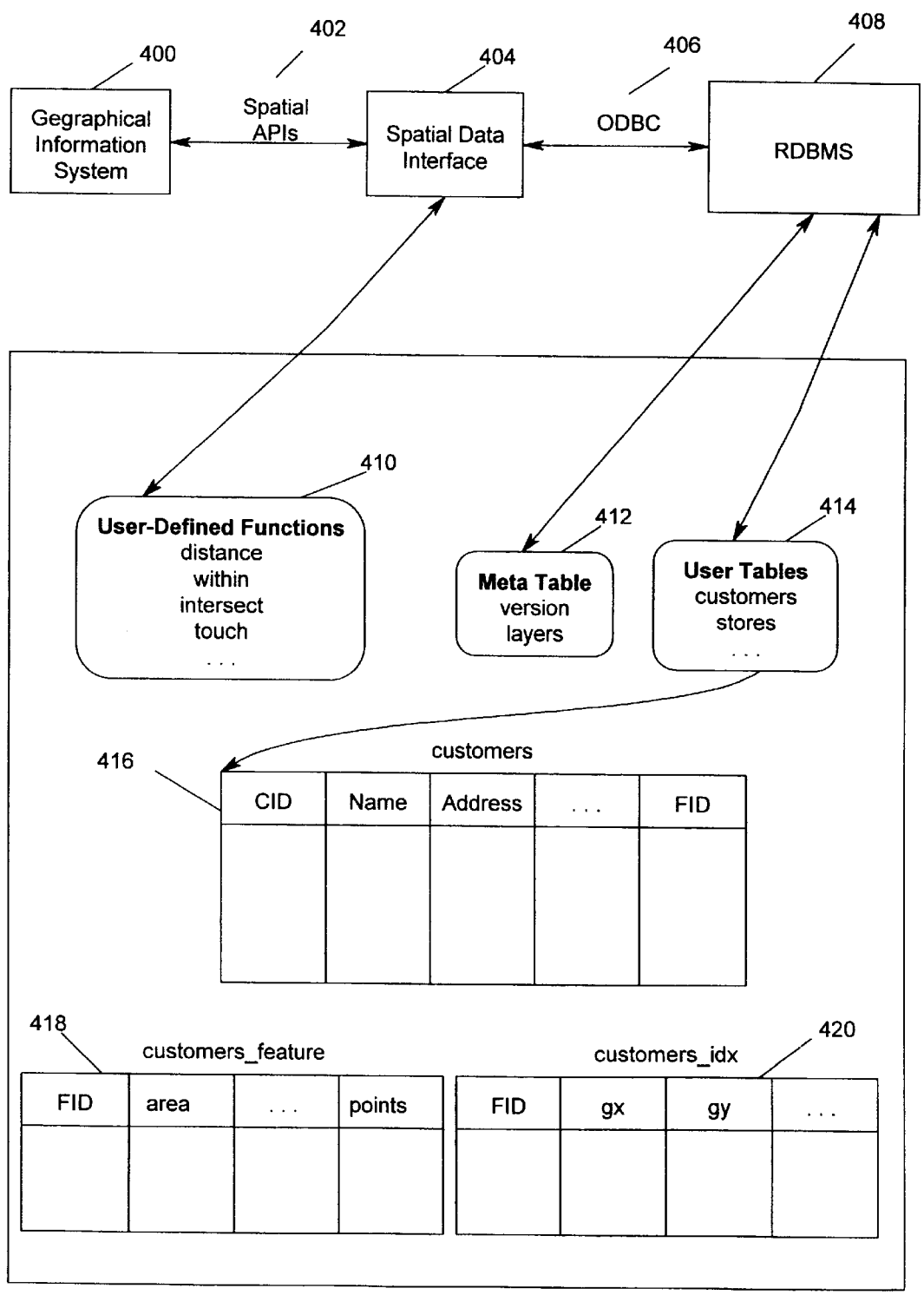
FIG. 4 illustrates a conventional system in which each spatial column of a table, has two additional tables, one for indexing and the other for data.

FIG. 4 illustrates a conventional system. In the conventional system illustrated in FIG. 4, spatial queries are composed by users using the geographical information system 400 via a graphical user interface (GUI) or using script language. The spatial queries are transmitted from the geographical information system 400 to the spatial data interface 404 using spatial application programming interfaces (APIs) 402.

The spatial data interface 404 first transforms the spatial constraints in the query, if any, into a complicated set of SQL predicates that exploit the spatial index. Then, the spatial data interface 404 composes a full SQL query and transmits the query to the RDBMS 408 via an Open Database Connectivity (ODBC) driver 406. The RDBMS 408 compiles and executes the SQL query without knowing that the underlying query is a spatial query.

In the conventional system, for each spatial column (i.e., each column that holds spatial data) of a table, there is a unique feature identifier (FID). The FID is associated with two additional tables ("side tables"), one for indexing (i.e., a spatial index) and the other for the spatial data (i.e., a spatial data table). A spatial data interface 404 populates these tables in the RDBMS 408. In particular, the spatial data interface 404 populates data into the table, customers 416, which contains a spatial column "Address". The spatial data interface 404 also populates the spatial data table, customers_feature 418, with spatial data. Additionally, the spatial data interface 404 generates the spatial index, customers_idx 420, and maintains this spatial index.

In the spatial data table, customers_feature 418, each column is an attribute of a compound object. For example, the "Address" column of the customers table contains data of a spatial type, with several attributes, including "gx" and "gy". The customers_feature table 418 contains columns for each of the attributes, "gx" and "gy". The customers_feature table 418 simulates a structured data type, which only the spatial data interface 404 understands. The RDBMS 408 does not understand either the spatial index 420 or the spatial data table 418. The spatial data interface 404 stores values for a structured data type into the tables. In particular, the spatial data interface 404 creates the spatial data table 418 for holding spatial data and populates the spatial data table. The spatial data interface 404 adds a feature identifier (FID) column to the customers table 416 to match the FID column added to the spatial data table 418 when it was created by the spatial data interface 404. The spatial data interface 404 maintains the structured data type. The RDBMS 408 does not understand the structured data type.

Additionally, a set of spatial functions and predicates are registered in the RDBMS as User-Defined Functions 410. User-defined functions include, for example, distance, within, intersect, and touch functions. A database administrator (DBA) creates meta tables 412 for the administration of spatial operations. The meta tables 412 include version and layers tables. The layers field keeps track of which table and column were used to create a new layer (i.e., view). For example, the customers table 416 and the FID together create a view of geographic information for "Address".

The RDBMS also includes a user tables list 414, which identifies tables, such as customers and stores. The user tables list 414 includes references or indicates (e.g., pointers) to tables. One table, customers 416, contains five columns: CID for customer identifier, Name, Address, . . . (i.e., the ellipses indicate that one or more other columns could be included in the customers table), and FID for feature identifier.

The following provides an example of the steps performed by the spatial data interface 404 in a conventional system. The spatial data interface 404 receives a command from the geographical information system 400 to get data from the database. For example, the command may request the distance between two addresses. The spatial data interface 404, rather than the RDBMS 408, optimizes the query and uses indexes to get spatial data from a database by joining a spatial index with a spatial data table.

In particular, the spatial data interface 404 uses the customers_idx spatial index 420 to access the customers_feature spatial data table 418. The spatial data interface 404 pulls data from the customers table 416 using a SELECT statement. The spatial data interface 404 evaluates the distance user-defined function 410 for each tuple pulled from the customers table 416. Then, the spatial data interface 404 returns the results to the geographical information system 400.

Conventional systems, such as that illustrated in FIG. 4, have a number of disadvantages. First, there is a data integrity problem because the spatial data is stored outside of the user table (e.g., customers 416) and the spatial index is not maintained by the RDBMS 408.

Second, there is storage overhead because the side tables are expensive and extra indices are needed for the user table's FID columns and for the feature table's FID column. Additionally, there is an index table with one index on the FID column and one index on the remaining columns.

Third, maintenance is complicated. For example, two side tables are created for each spatial column. Moreover, triggers need to be created for maintaining the integrity between the user table and the feature table, including insert triggers, delete triggers, and update triggers. Also, the technique for exploiting the spatial index outside of the RDBMS 408 and in the spatial data interface 404 is a very complicated one.

Fourth, performance is not very good. The performance normally depends on the optimizer of the RDBMS 408 to select certain join orders, but the index exploitation is completely outside of the index manager component of the RDBMS 408. Therefore, exploiting a spatial index may result in a non-optimal access plan.

Fifth, the limitations of the conventional system include the inability to do index selection and the inability to do index-Oring. The spatial data interface 404 cannot optimize multiple spatial predicates that are ORed together. For example, for the predicate "all customers within(circleA) or within(circleB)", the spatial data interface 404 processes the "within(CircleA)" function and the "within(circleB)" function separately, without eliminating duplicates.

Sixth, in a case in which there are spatial (e.g., location= within (circle)) and non-spatial (e.g., income>50000) predicates in a query, there are multiple access paths possible, one with an index on income and one with an index on location. However, the spatial data interface 404 does not understand this, and so the spatial data interface 404 does not optimize the query.

The fully integrated architecture enables users to provide user-defined functions in the RDBMS that enable the RDBMS to handle user-defined data types, such as data types for spatial data. The fully integrated architecture avoids the requirement of maintaining a separate index and data table for each spatial data column. Additionally, with the fully integrated architecture, the spatial data interface receives a SQL statement, and the RDBMS will process the statement, without the need for the spatial data interface to transform the statement into one which the RDBMS can understand.

Figure 5:
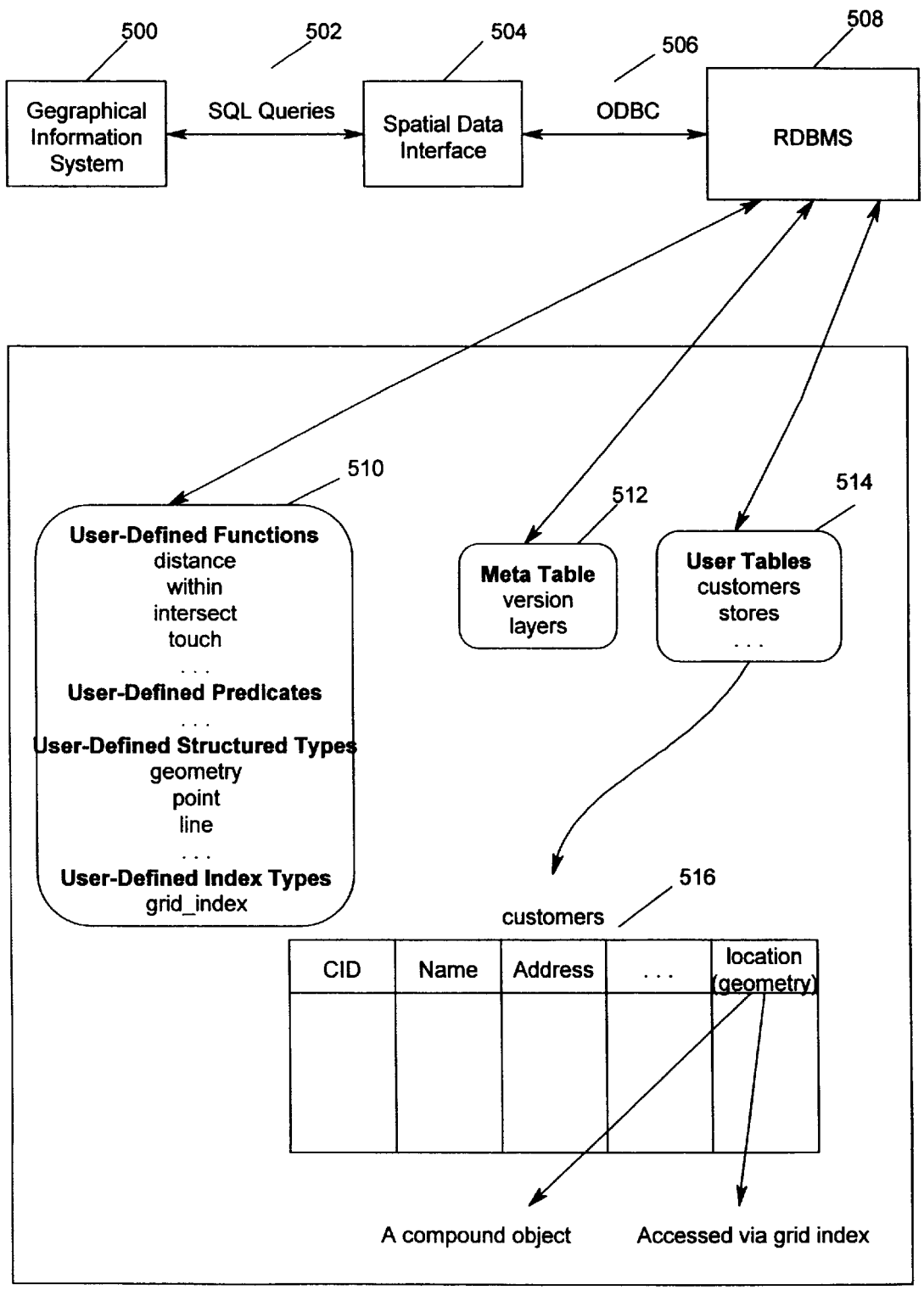
FIG. 5 is a block diagram illustrating a fully integrated architecture of the present invention.

FIG. 5 is a block diagram illustrating a fully integrated architecture of one embodiment of the present invention. A set of spatial functions are registered in the RDBMS as User-Defined Functions 510. Additionally, a set of spatial predicates are registered in the RDBMS as User-Defined Predicates 510. A set of geographical types are registered in the RDBMS as User-Defined Structured Types 510. A set of geographical index types are registered in the RDBMS as User-Defined Index Types 510. The database administrator creates meta tables 512 for the administration of spatial operations, including a version table and a layers table.

A customers table 516 includes columns with customer information, including a spatial column, location(geometry). For each spatial column of a table, the column type is one of the user-defined structured types and a spatial index is created and maintained by the RDBMS.

With the fully integrated architecture, users can submit SQL queries 502 via the geographical information system 500. The SQL queries 502 are forwarded to the spatial data interface 504. The spatial data interface 504 transmits the SQL queries 502 to the RDBMS 508 via the ODBC driver 508, without any additional processing. The RDBMS then performs the SQL queries 502 and returns results to the spatial data interface 504. In particular, the RDBMS 508 exploits the spatial index, if using the spatial index results in the optimal plan, retrieves spatial data, executes user-defined functions and predicates, etc. The spatial data interface 504 forwards the results to the geographical information system 500.

The fully integrated architecture improves performance significantly. For example, to determine the names of customers whose address is within a particular "circle" or area of a map, the RDBMS 508 uses a user-defined index for the user-defined type to retrieve spatial data from a table. On the other hand, the spatial data interface would process spatial APIs by pulling all required data out of the RDBMS, executing user-defined functions, and applying filtering functions. However, for efficiency, it is best to apply the filtering function as close to the data source as possible.

Figure 6:
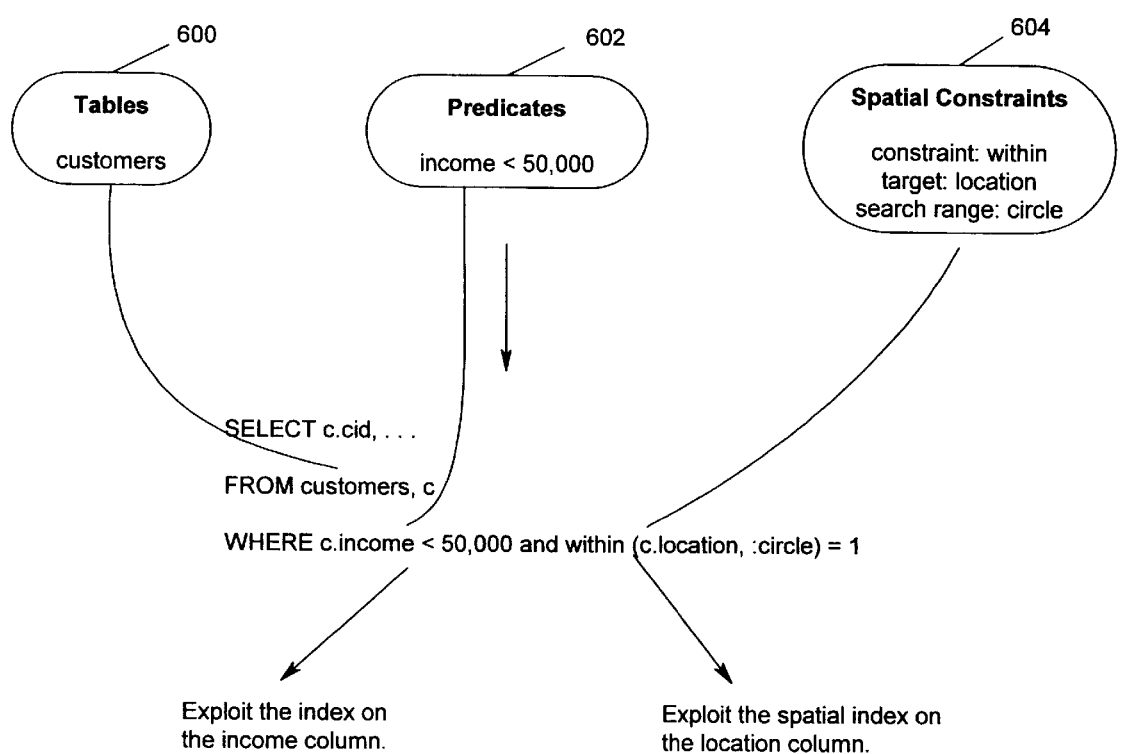
FIG. 6 is a block diagram illustrating an example of the exploitation of spatial constraints.

FIG. 6 is a block diagram illustrating an example of the exploitation of spatial constraints. In FIG. 6, the diagram reflects the following example: Find all of the customers whose income is greater than 50,000 and whose location is completely within 10 miles of a particular location. The following is an example of a SQL statement used to query the RDBMS for the desired customers:

SELECT c.cid, . . .
  FROM customers, c
  WHERE c.income>50,000 and within (c.location, :circle)=1

The table 600 used for the query is the customers table. The predicate 602 is "income>50,000," which exploits the index on the income column. The spatial constraint 604 is "constraint:within, target:location, search range:circle," which exploits the spatial index on the location column and uses the user-defined function "within".

In one embodiment, the present invention pushes spatial data into a single column. The following is an example of spatial data:

CREATE ADT geometry
  (gtype char (1),
  area float,
  length float,
  xmin float,
  ymin float,
  xmax float,
  ymax float,
  numOfParts int,
  numOfPoints int,
  points blob (1M);
CREATE ADT point UNDER geometry;
CREATE ADT line UNDER geometry;
CREATE ADT polygon UNDER geometry;
CREATE TABLE customers
  (cid int,
  varchar(20)
  address varchar (50)
  income float,
  . . .
  location point LENGTH 100,
  zone polygon LENGTH 1000);

The CREATE ADT geometry statement creates an abstract data type called geometry. The geometry ADT has the following parameters: gtype of type character, area of type float, length of type float, xmin of type float, ymin of type float, xmax of type float, ymax of type float, numOfParts of type integer, and points of type blob (i.e., binary large object).

There are several sub-types built using the geometry ADT. Each sub-type takes on the characteristics of the super-type from which it is created. That is, each ADT created under the geometry ADT includes all of the parameters of the geometry ADT. The point, line, and polygon ADTs are created under the geometry ADT.

The CREATE TABLE statement creates a table named customers with the following columns: cid of type integer, name of type variable character, address of type variable character, income of type float, location of type point, and zone of type polygon. The ellipses indicate that other columns may exist for the customers table.

With one embodiment of the present invention, a spatial column does not require two additional tables (i.e., the index and feature tables). Additionally, there is no limitation on the size of the spatial column. Large object ("LOB") attributes (e.g., the points attribute) are stored in-line for better performance whenever possible.

A rich set of spatial types (e.g., geometry, point, line, polygon, etc.) are provided for modeling the spatial data. Moreover, subtype hierarchy reflects the type semantics of the spatial data.

Figure 7:
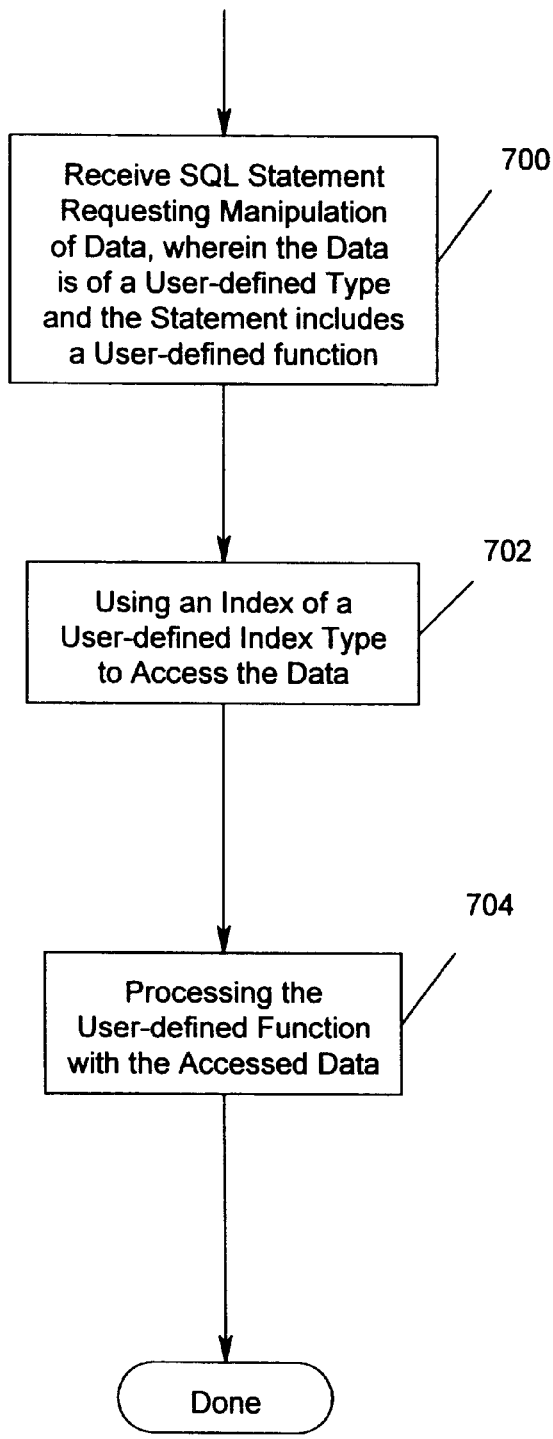
FIG. 7 is a flow diagram illustrating the steps performed by the RDBMS of the present invention.

FIG. 7 is a flow diagram illustrating the steps performed by the RDBMS of the present invention. In Block 700, the RDBMS receives a SQL statement that requests the manipulation (e.g., inserting, deleting, updating, etc.) of data in the database. The data is of a user-defined type and the statement includes a user-defined function. In Block 702, the RDBMS uses an index of a user-defined index type to access the data. In Block 704, the RDBMS processes the user-defined function with the accessed data.

Figure 8:
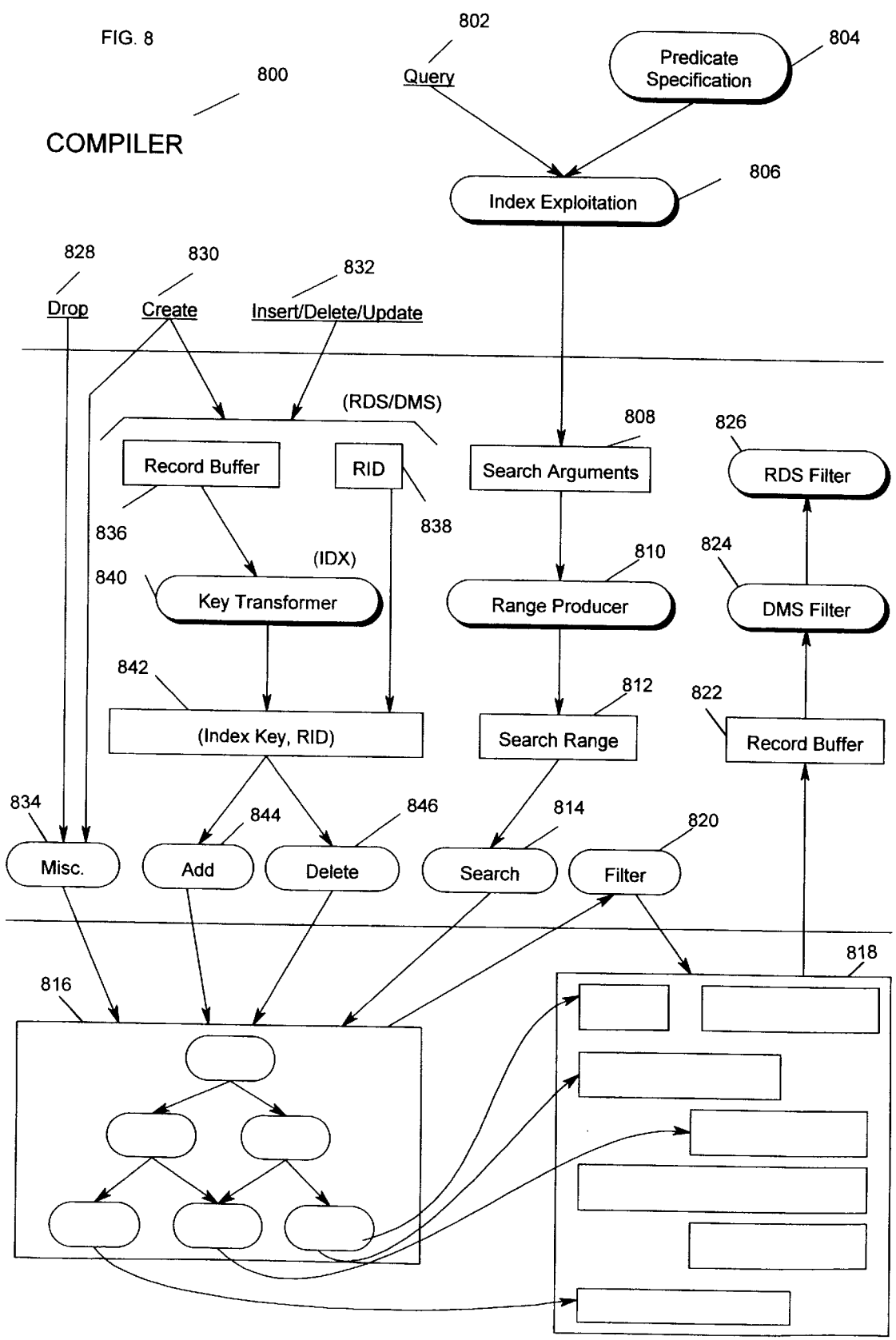
FIG. 8 illustrates a compiler of the present invention.

FIG. 8 illustrates a compiler 800 of the present invention, which performs steps 204 and 206, discussed above. The compiler 800 of the present invention contains the following "extended" modules: Predicate Specification 804 and Index Exploitation 806. The run-time 850 of the present invention contains the following "extended" modules: Range Producer 810, DMS Filter 824, RDS Filter 826, and Key Transformer 840. The "extended" modules have been modified to provide the capability for pushing user-defined types, index maintenance and index exploitation, and user-defined functions and predicates inside the database.

The Predicate Specification module 804 has been extended to handle user-defined predicates. The Index Exploitation module 806 has been modified to exploit user-defined indexes and provide more sophisticated pattern matching (e.g., recognizes "salary+bonus").

Additionally, the Predicate Specification module 804, the Index Exploitation module 806, and the DMS Filter module 824 work together to provide a technique to evaluate user-defined predicates using a three-stage technique. In the first stage, an index is applied to retrieve a subset of records using the following modules: Search Arguments 808, Range Producer 810, Search Range 812, Search 814, and Filter 820. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate.

The Range Producer module 810 has been extended to handle user-defined ranges, and, in particular, to determine ranges for predicates with user-defined functions and user-defined types. The DMS Filter module 824 and the RDS Filter module 826 have been extended to handle user-defined functions for filtering data.

To process a query 802, the compiler 800 receives the query 802. The query 802 and the predicate specification from the Predicate Specification module 804 are submitted to the Index Exploitation module 806. The Index Exploitation module 806 performs some processing to exploit indexes. At run-time, the Search Arguments module 808 evaluates the search argument that will be used by the Range Producer module 810 to produce search ranges. The Range Producer module 810 will generate search ranges based on user-defined functions. The Search Range module 812 will generate final search ranges. The Search module 814 will perform a search using the B-Tree 816 to obtain the record identifier (ID) for data stored in the data storage device 818. The retrieved index key is submitted to the Filter module 820, which eliminates non-relevant records. Data is then fetched into the Record Buffer module 822 for storage. The DMS Filter module 824 and the RDS Filter module 826 perform final filtering.

The Key Transformer module 840 has been modified to enable users to provide user-defined functions for processing inputs to produce a set of index keys. The user-defined functions can be scalar functions or table functions. A scalar function generates multiple key parts to be concatenated into an index key. A table function generates multiple sets of key parts, each of which is to be concatenated into an index key. Additionally, the input to the Key Transformer module 840 can include multiple values (e.g., values from multiple columns or multiple attributes of a structured type), and the user-defined functions can produce one or more index keys.

The compiler 800 can process various statements, including a Drop 828, Create/Rebuild 830, or Insert/Delete/Update 832 statements. A Drop statement 828 may be handled by Miscellaneous modules 834 that work with the B-Tree 816 to drop data.

An Insert/Delete/Update statement produce record data in the Record Buffer module 836 and the RID module 838. The data in the Record Buffer module 836 is submitted to the Key Transformer module 840, which identifies key sources in the records it receives. Key targets from the Key Transformer module 840 and record identifiers from the RID module 838 are used by the Index Key/RID module 842 to generate an index entry for the underlying record. Then, the information is passed to the appropriate module for processing, for example, an Add module 844 or a Delete module 846.

The compiler 800 will process a Create/Rebuild statement 830 in the manner of the processing a Drop statement 828 when data is not in the table or an Insert/Delete/Update statement 832 when data is in the table.

The fully integrated architecture pushes user-defined types, indexes for the user-defined types, and user-defined functions and predicates into the RDBMS 508. By doing this, the fully integrated architecture enables the RDBMS to understand and handle user-defined types, indexes for user-defined types, and user-defined functions and predicates. The fully integrated architecture simplifies the geographical information system 500 by enabling users to submit SQL, queries, rather than spatial APIs, to retrieve information. The fully integrated architecture builds on existing RDBMS technology, which gives users of the geographical information system 500 the advantages of a RDBMS, such as recovery of data, concurrency, data integrity, and backup.

Moreover, the fully integrated architecture does not impact existing applications, which may use spatial APIs. Instead, the fully integrated architecture "extends" the existing spatial data processing to enable users to either submit spatial APIs or SQL queries to process spatial data.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented fully integrated architecture for user-defined search. The present invention pushes maintenance of structured data types into the database. Additionally, the present invention pushes user-defined functions and predicates into the database. The present invention also pushes index maintenance and index exploitation into the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a database stored on a data storage device connected to a computer, the database containing data, the method comprising the steps of:

under control of the database,
receiving the statement requesting manipulation of the data, wherein the statement includes a user-defined function;
using an index of a user-defined function index type to access the data, wherein the index of the user-defined function index type is in the database; and
after using the index, processing the user-defined function with the accessed data.

2. The method of claim 1, wherein the statement is a SQL query.

3. The method of claim 1, wherein the data is of a user-defined data type.

4. The method of claim 1, wherein the step of using the index further comprises index exploitation.

5. The method of claim 1, further comprising the step of, under control of the database, maintaining the index.

6. The method of claim 1, wherein the statement includes a user-defined predicate.

7. The method of claim 5, further comprising the step of, under control of the database, processing the user-defined predicate with the accessed data.

8. An apparatus for executing a statement, comprising:
a computer having a data storage device connected thereto, wherein the data storage device stores a database containing data; and
one or more computer programs, performed by the computer, for under control of the database, receiving the statement requesting manipulation of the data, wherein the statement includes a user-defined function, for using an index of a user-defined function index type to access the data, wherein the index of the user-defined function index type is in the database, and, after using the index, processing the user-defined function with the accessed data.

9. The apparatus of claim 8, wherein the statement is a SQL query.

10. The apparatus of claim 8, wherein the data is of a user-defined data type.

11. The apparatus of claim 8, wherein the means for using the index further comprises means for index exploitation.

12. The apparatus of claim 8, further comprising the means for, under control of the database, maintaining the index.

13. The apparatus of claim 8, wherein the statement includes a user-defined predicate.

14. The apparatus of claim 13, further comprising the means for, under control of the database, processing the user-defined predicate with the accessed data.

15. An article of manufacture comprising a computer program carrier readable by a computer and embodying one or more instruction executable by the computer to perform method steps for executing a statement in a database stored on a data storage device connected to a computer, wherein the database contains data, the method comprising the steps of:

under control of the database,
receiving the statement requesting manipulation of the data, wherein the statement includes a user-defined function;
using an index of a user-defined function index type to access the data, wherein the index of the user-defined function index type is in the database; and
after using the index, processing the user-defined function with the accessed data.

16. The article of manufacture of claim 15, wherein the statement is a SQL query.

17. The article of manufacture of claim 15, wherein the data is of a user-defined data type.

18. The article of manufacture of claim 15, wherein the step of using the index further comprises index exploitation.

19. The article of manufacture of claim 15, further comprising the step of, under control of the database, maintaining the index.

20. The article of manufacture of claim 15, wherein the statement includes a user-defined predicate.

21. The article of manufacture of claim 20, further comprising the step of, under control of the database, processing the user-defined predicate with the accessed data.

22. A data storage device for storing a database containing data for access by a computer program being executed by a computer system, comprising:
a data structure in the data storage device, the data structure including information resident in a database used by the computer program and including:
user-defined data types for defining data types;
user-defined functions for manipulating data;
user-defined index types for creating user-defined indexes to be used to access data that is processed with one or more user-defined functions, wherein the user-defined indexes are in the database; and
at least one table containing at least one column for data of a user-defined data type.

* * * * *